J. A. ENOS.
Gas-Purifiers and Regulators.

No. 139,131.  Patented May 20, 1873.

Witnesses.  Inventor.

UNITED STATES PATENT OFFICE.

JOHN A. ENOS, OF PEABODY, MASSACHUSETTS, ASSIGNOR OF THREE-FOURTHS HIS RIGHT TO GEORGE HOLMAN, GEORGE PLUMER, AND JAMES O. WHITTEN, OF SAME PLACE.

IMPROVEMENT IN GAS PURIFIERS AND REGULATORS.

Specification forming part of Letters Patent No. 139,131, dated May 20, 1873; application filed April 30, 1873.

*To all whom it may concern:*

Be it known that I, JOHN A. ENOS, of Peabody, in the county of Essex and State of Massachusetts, have invented a new and valuable Improvement in Gas Purifiers and Regulators; and I do hereby declare that the following is a full, clear, and exact description of the construction and operation of the same, reference being had to the annexed drawing making a part of this specification and to the letters and figures of reference marked thereon.

Figure 1:
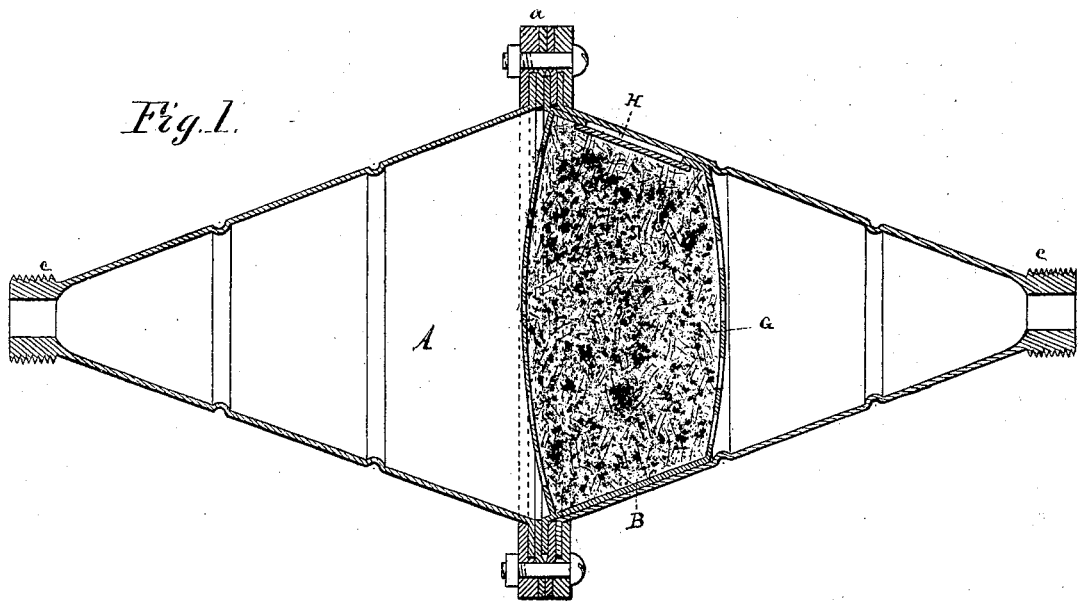
Figure 2:
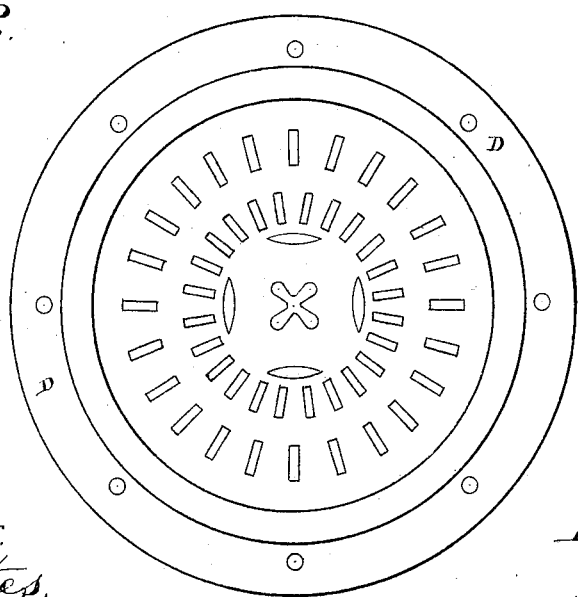

Figure 1 of the drawing is a longitudinal section of my gas purifier and regulator. Fig. 2 is an end view of same.

My invention relates to means for purifying and regulating the flow of hydrocarbon gas; and consists in the novel construction and arrangement of the perforated basket filled with finely chopped or divided sponge, and incased in a tubular casing constructed of two cones with their bases united, and made separable, as hereinafter described.

A of the drawing represents a tubular casing consisting of two cones, as shown, with their bases united by flanges, nuts, and screws, and having, respectively, a screw-thread, c, adapted for attachment to the outlet-pipe from the meter. The letter a represents packing-rings interposed between the flanges of the casing. B represents a basket constructed of tin or other suitable metal in a conical shape, and adapted to fit neatly inside the cone that is furthest from the meter, so that the largest end thereof shall be turned toward said meter. Each end of this basket is perforated, as shown on Fig. 2 of the drawing. The letter D represents a flange extending around the large end of the basket B, and which, passing over the flange of the cone and below the packing-rings, serves to hold the basket securely in position. H represents an opening in the side of my basket, and covered with a slide door. This opening is adapted for filling and emptying the basket, as hereinafter mentioned. The letter G represents the purifying and regulatting material inclosed within the basket, and consists of small pieces of sponge prepared by cutting ordinary masses of sponge in a cutting-machine corresponding to a meat-chopper. When thus prepared by cutting into very small pieces the sponge is packed into the basket as closely as possible by suitable tamping instruments. I usually employ a mallet and chisel for this purpose.

By constructing the basket of sheet or cast metal, instead of wire or cloth, the operator is enabled to pack the finely-separated sponge with great ease in a dense and homogeneous manner.

The gas, in passing through the cut sponge, is regulated in its flow and purified, and ample room is provided for the condensation by the peculiar form of the casing. By means of the nuts and screws which unite the flanges of the cones, the condensation is easily removed, and provision is made for removing the basket and changing the same at will.

If desirable, I may apply a faucet to the bottom of the cylindrical cones for drawing off the condensation.

What I claim as new, and desire to secure by Letters Patent, is—

1. In a gas purifying and regulating apparatus, arranged for attachment to the gas-pipe between the meter and the burner, the cylindrical casing A, consisting of two cones with their bases united by flanges, nuts and screws, and packing-rings, in combination with the interior metallic basket B filled and closely packed with fine-cut sponge, substantially as and for the purpose specified.

2. In a gas purifier and regulator, the conical basket B, of sheet or cast metal, having perforated ends and holding flange, as described, and filled with finely-cut and closely-packed sponge, substantially as specified.

3. As a filling for a sheet or cast metal basket of a gas-purifying machine, the finely-cut sponge G, applied and packed as described.

In testimony that I claim the above I have hereunto subscribed my name in the presence of two witnesses.

JOHN A. ENOS.

Witnesses:
PH. C. MASI,
GEORGE E. UPHAM.